United States Patent
Takahashi et al.

(10) Patent No.: US 12,388,319 B2
(45) Date of Patent: Aug. 12, 2025

(54) VEHICLE DRIVE DEVICE

(71) Applicant: AISIN CORPORATION, Aichi (JP)

(72) Inventors: Nozomu Takahashi, Kariya (JP); Hiroaki Sanji, Kariya (JP)

(73) Assignee: AISIN CORPORATION, Kariya (JP)

( * ) Notice: Subject to any disclaimer, the term of this patent is extended or adjusted under 35 U.S.C. 154(b) by 139 days.

(21) Appl. No.: 18/272,265

(22) PCT Filed: Mar. 7, 2022

(86) PCT No.: PCT/JP2022/009625
§ 371 (c)(1),
(2) Date: Jul. 13, 2023

(87) PCT Pub. No.: WO2022/209600
PCT Pub. Date: Oct. 6, 2022

(65) Prior Publication Data
US 2024/0305160 A1    Sep. 12, 2024

(30) Foreign Application Priority Data
Mar. 31, 2021  (JP) .................................. 2021-062071

(51) Int. Cl.
*H02K 5/22* (2006.01)
*H02K 7/116* (2006.01)
(Continued)

(52) U.S. Cl.
CPC ............. *H02K 5/225* (2013.01); *H02K 7/116* (2013.01); *H02K 11/21* (2016.01); *H02K 11/33* (2016.01); *H02K 2211/03* (2013.01)

(58) Field of Classification Search
CPC ........ H02K 5/225; H02K 7/116; H02K 11/21; H02K 11/33; H02K 2211/03; H02K 11/30; H02K 5/22
See application file for complete search history.

(56) References Cited

U.S. PATENT DOCUMENTS

2006/0108884 A1* 5/2006 Shiino .................... B60T 8/267
                                                    310/68 B
2013/0010426 A1   1/2013 Nakano et al.
(Continued)

FOREIGN PATENT DOCUMENTS

WO   2019/022105 A1   1/2019
WO   2019/208096 A1   10/2019

OTHER PUBLICATIONS

Jun. 7, 2024 extended Search Report issued in European Patent Application No. 22779824.6.

*Primary Examiner* — Mohamad A Musleh
(74) *Attorney, Agent, or Firm* — Oliff PLC

(57) ABSTRACT

A vehicle drive device includes: a rotation electric machine; a power transmission mechanism; a drive device; an accommodating member in which a first accommodating chamber which accommodates the rotation electric machine, a second accommodating chamber which accommodates the power transmission mechanism, and a third accommodating chamber which accommodates the drive device are formed, and in which a first partition wall portion which partitions the first accommodating chamber and the second accommodating chamber in an axial direction and a second partition wall portion which partitions the second accommodating chamber and the third accommodating chamber in a radial direction are formed; a rotation angle sensor provided in the first accommodating chamber and configured to acquire rotation angle information of the rotation electric machine; and a first interconnect electrically coupling the rotation angle sensor and the drive device.

16 Claims, 6 Drawing Sheets

(51) Int. Cl.
*H02K 11/21* (2016.01)
*H02K 11/33* (2016.01)

(56) References Cited

U.S. PATENT DOCUMENTS

2020/0177067 A1 6/2020 Okuhata et al.
2020/0212753 A1 7/2020 Okuhata et al.

* cited by examiner

VEHICLE DRIVE DEVICE

TECHNICAL FIELD

This disclosure relates to a vehicle drive device.

BACKGROUND ART

In relation to an interconnect structure for electrically coupling a rotation angle sensor for acquiring rotation angle information of a rotation electric machine and a drive device for driving the rotation electric machine, a technique for disposing an interconnect from the rotation angle sensor outside a case and a technique for passing an interconnect through a groove portion formed inside a motor cover are known.

Examples of the related art include WO2019/208096 (Reference 1) and WO2019/022105 (Reference 2).

SUMMARY OF DISCLOSURE

Technical Problem

However, in the related art as described above, it is difficult to efficiently route a low-voltage interconnect or the like from the rotation angle sensor while securing an insulation distance to a high-voltage interconnect portion (for example, a terminal block) electrically coupled to a coil of a rotation electric machine.

Therefore, an object of this disclosure is to efficiently route a low-voltage interconnect or the like from a rotation angle sensor inside a case while securing an insulation distance to a high-voltage interconnect portion electrically coupled to a coil of a rotation electric machine.

Solution to Problem

According to an aspect of this disclosure, there is provided a vehicle drive device, which includes:
- a rotation electric machine;
- a power transmission mechanism configured to transmit power based on a rotational torque generated by the rotation electric machine to a wheel;
- a drive device configured to drive the rotation electric machine;
- an accommodating member in which a first accommodating chamber which accommodates the rotation electric machine, a second accommodating chamber which accommodates the power transmission mechanism, and a third accommodating chamber which accommodates the drive device are internally formed;
- a rotation angle sensor provided at an end portion of the rotation electric machine at a second accommodating chamber side in an axial direction in the first accommodating chamber and configured to acquire rotation angle information of the rotation electric machine; and
- a first interconnect electrically coupling the rotation angle sensor and the drive device, in which
- in the accommodating member, a first partition wall portion which partitions the first accommodating chamber and the second accommodating chamber in the axial direction and a second partition wall portion which partitions the first accommodating chamber and the second accommodating chamber from the third accommodating chamber in a radial direction are formed,
- the first interconnect is routed so as to reach an inside of the second accommodating chamber from an inside of the first accommodating chamber through the first partition wall portion and reach the third accommodating chamber from the inside of the second accommodating chamber through the second partition wall portion,
- a terminal block electrically coupled to a coil of the rotation electric machine is provided in a first portion of the second partition wall portion which partitions the first accommodating chamber, and a first connector is provided in a second portion of the second partition wall portion which partitions the second accommodating chamber, and
- the first interconnect reaches the third accommodating chamber from the inside of the second accommodating chamber via the first connector.

Advantageous Effects of Disclosure

According to this disclosure, a low-voltage interconnect or the like from a rotation angle sensor can be efficiently routed inside the case while securing an insulation distance to a high-voltage interconnect portion electrically coupled to a coil of a rotation electric machine.

DESCRIPTION OF EMBODIMENTS

Figure 1:
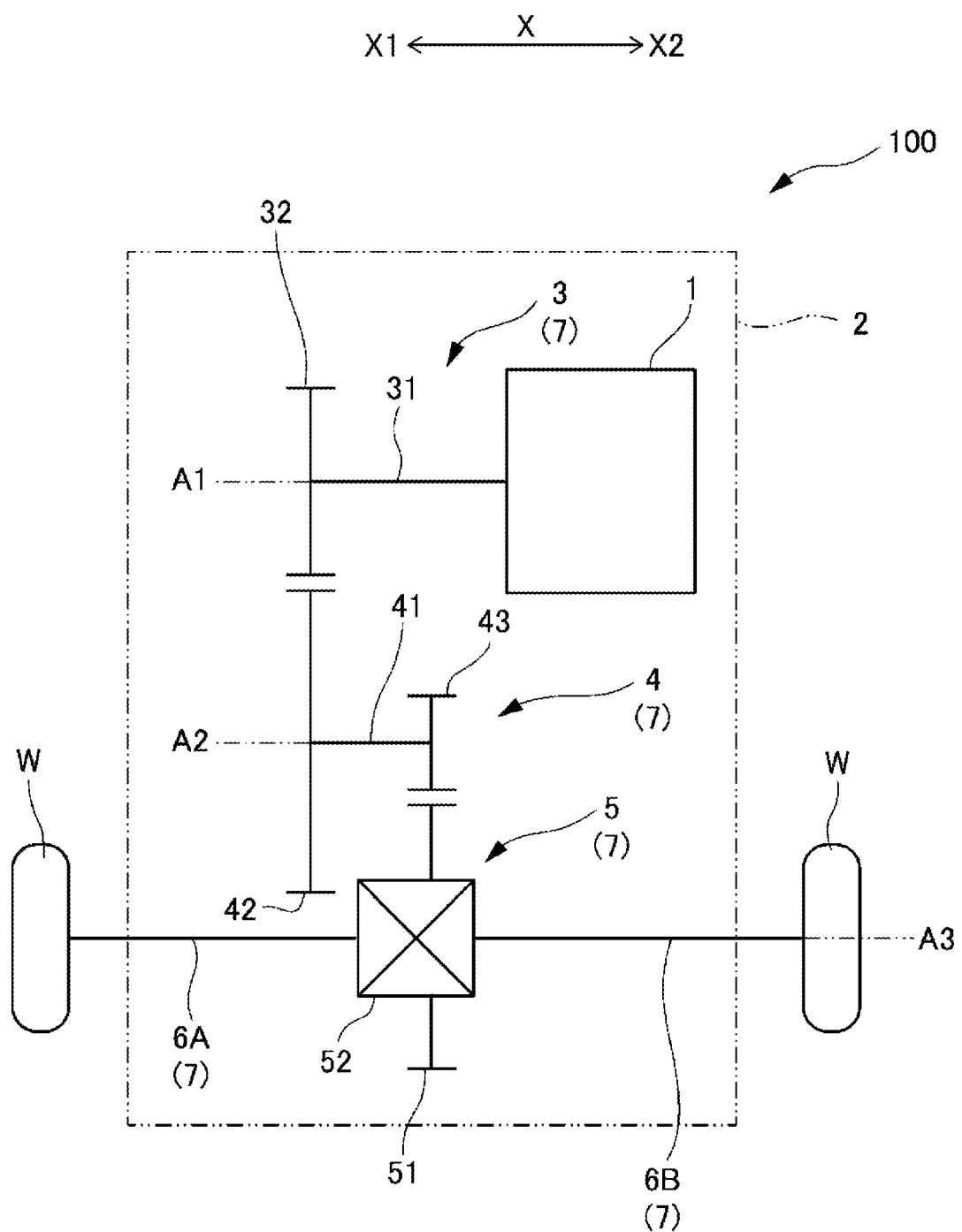
FIG. 1 is a skeleton diagram of a vehicle drive system including a rotation electric machine and a power transmission mechanism.

Hereinafter, an embodiment will be described in detail with reference to the accompanying drawings. Dimensional ratios in the drawings are merely examples, and this disclosure is not limited thereto. Shapes and the like in the drawings may be partially exaggerated for convenience of description.

Hereinafter, first, a vehicle drive system 100 to which a vehicle drive device 17 according to the embodiment is suitably applicable will be described, and the vehicle drive device 17 according to the embodiment will be described.

[Overall Drive System]

FIG. 1 is a skeleton diagram of the vehicle drive system 100 including a rotation electric machine 1 and a power transmission mechanism 7. In FIG. 1, an X direction and an X1 side and an X2 side along the X direction are defined. The X direction is parallel to a direction of a first axis A1 (hereinafter also referred to as an "axial direction").

In an example shown in FIG. 1, the vehicle drive system 100 includes the rotation electric machine 1 serving as a drive source of wheels, and the power transmission mechanism 7 provided in a power transmission path coupling the rotation electric machine 1 and wheels W. The power transmission mechanism 7 includes an input member 3, a counter gear mechanism 4, a differential gear mechanism 5, and left and right output members 6A and 6B.

The input member 3 includes an input shaft 31 and an input gear 32. The input shaft 31 is a rotation member which rotates around the first axis A1. The input gear 32 is a gear which transmits a rotational torque (driving force) from the rotation electric machine 1 to the counter gear mechanism 4. The input gear 32 is provided on the input shaft 31 of the input member 3 so as to rotate integrally with the input shaft 31 of the input member 3.

The counter gear mechanism 4 is disposed between the input member 3 and the differential gear mechanism 5 in the power transmission path. The counter gear mechanism 4 includes a counter shaft 41, a first counter gear 42, and a second counter gear 43.

The counter shaft 41 is a rotation member which rotates around a second axis A2. The second axis A2 extends parallel to the first axis A1. The first counter gear 42 is an input element of the counter gear mechanism 4. The first counter gear 42 meshes with the input gear 32 of the input member 3. The first counter gear 42 is coupled to the counter shaft 41 so as to rotate integrally with the counter shaft 41.

The second counter gear 43 is an output element of the counter gear mechanism 4. In the embodiment, as an example, the second counter gear 43 has a diameter smaller than that of the first counter gear 42. The second counter gear 43 is provided on the counter shaft 41 so as to rotate integrally with the counter shaft 41.

The differential gear mechanism 5 is disposed on a third axis A3 as a rotation axis of the differential gear mechanism 5. The third axis A3 extends parallel to the first axis A1. The differential gear mechanism 5 distributes a driving force transmitted from a rotation electric machine 1 side to the left and right output members 6A and 6B. The differential gear mechanism 5 includes a differential input gear 51, and the differential input gear 51 meshes with the second counter gear 43 of the counter gear mechanism 4. In addition, the differential gear mechanism 5 includes a differential case 52, and a pinion shaft, a pinion gear, left and right side gears, and the like are accommodated in the differential case 52. The left and right side gears are respectively coupled to the left and right output members 6A and 6B so as to rotate integrally.

The left and right output members 6A and 6B are drivingly coupled to the left and right wheels W, respectively. Each of the left and right output members 6A and 6B transmits the driving force distributed by the differential gear mechanism 5 to the wheels W. The left and right output members 6A and 6B may be constituted by two or more members.

In this way, the rotation electric machine 1 drives the wheels W via the power transmission mechanism 7. In another embodiment, another speed reduction mechanism such as a planetary gear mechanism may be used.

[Vehicle Drive Device]

Figure 2:
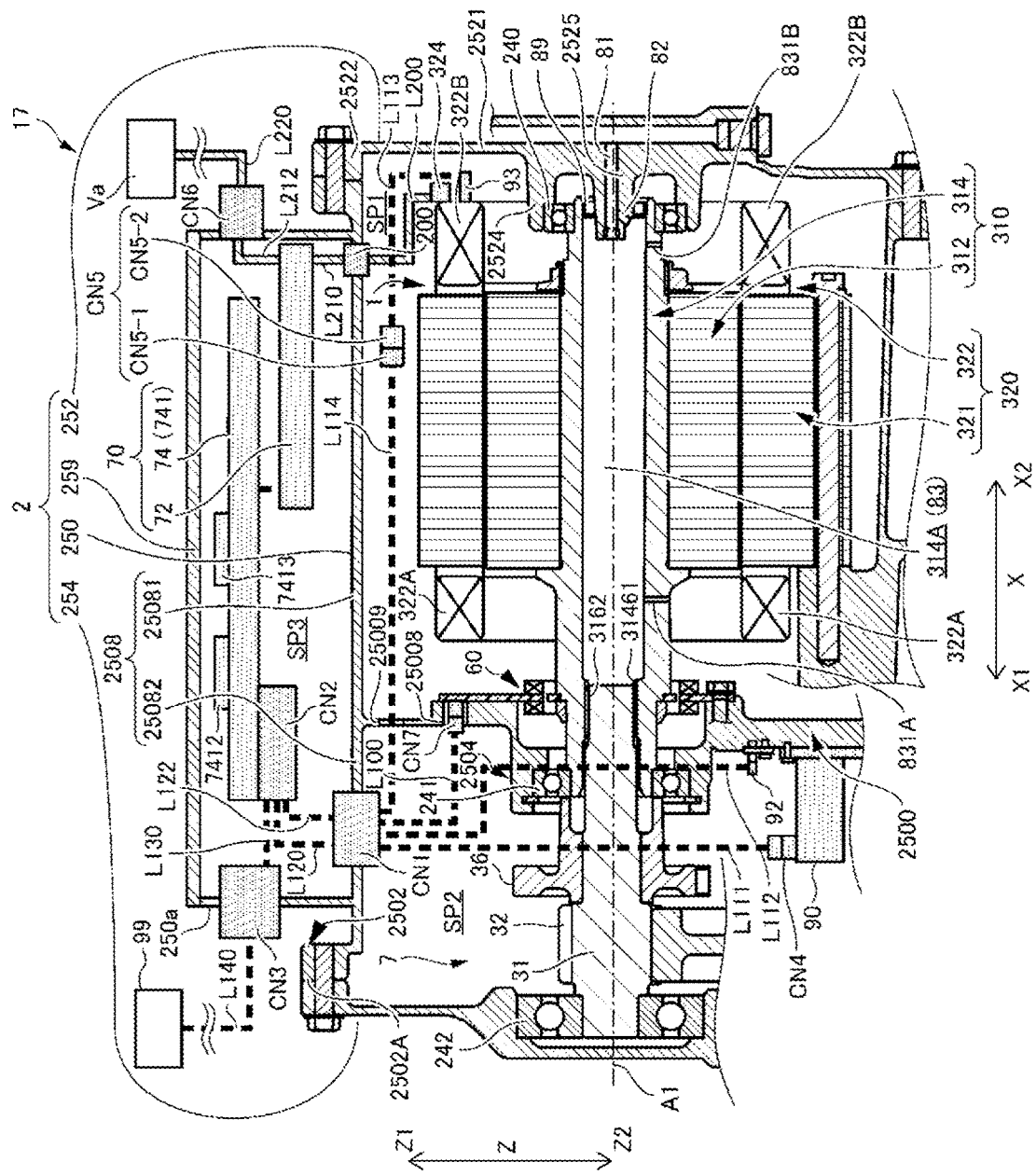
FIG. 2 is a cross-sectional view schematically showing main parts of the vehicle drive device.

FIG. 2 is a cross-sectional view schematically showing main parts of the vehicle drive device 17.

The vehicle drive device 17 includes the rotation electric machine 1, the power transmission mechanism 7, and a drive device 70, which are accommodated in a case 2.

The case 2 may be made of, for example, aluminum. The case 2 can be formed by casting or the like. The case 2 includes a motor case 250, a cover member 252, a gear case member 254, and a lid member 259.

The motor case 250 has a motor accommodating chamber SP1, which accommodates the rotation electric machine 1, formed therein. The expression "has the motor accommodating chamber SP1 formed therein" means that the motor accommodating chamber SP1 is at least partially surrounded by a wall body and does not need to be completely closed by the wall body. The same applies to a gear accommodating chamber SP2 and the like. The motor accommodating chamber SP1 may be an oil-tight space containing oil for cooling and/or lubricating the rotation electric machine 1 (and/or the power transmission mechanism 7). The motor case 250 has a peripheral wall portion which surrounds a radially outer side of the rotation electric machine 1. The motor case 250 is an integrally molded member, but may be implemented by combining a plurality of members.

In an example shown in FIG. 2, the motor case 250 includes a first partition wall portion 2500 which partitions the motor accommodating chamber SP1 and the gear accommodating chamber SP2 in the axial direction. The first partition wall portion 2500 faces a bottom portion 2521 (to be described later) of the cover member 252 in the axial direction.

A coupling portion 2502 with the gear case member 254, a bearing support portion 2504 which supports a bearing 241, and the like are formed at the first partition wall portion 2500 at an X-direction X1 side. The bearing support portion 2504 is formed in a central portion (a portion centered on the first axis A1) of the first partition wall portion 2500 at the X-direction X1 side in a manner of protruding to the X-direction X1 side. The bearing support portion 2504 is concentrically formed around the first axis A1.

The cover member 252 is coupled to the motor case 250 at an X-direction X2 side. The cover member 252 is in the form of a cover which covers the motor accommodating chamber SP1 at the X-direction X2 side. In this case, the cover member 252 may cover an opening portion of the motor case 250 at the X-direction X2 side in a manner of completely or substantially completely closing the opening portion. A part of the motor accommodating chamber SP1 at the X-direction X2 side may be formed by the cover member 252.

The motor case 250 includes an inverter case portion 250a, and the inverter case portion 250a has an inverter accommodating chamber SP3 formed therein. The drive device 70 which drives the rotation electric machine 1 is accommodated in the inverter accommodating chamber SP3. The inverter accommodating chamber SP3 extends in the axial direction in a manner of being adjacent to the motor accommodating chamber SP1 and the gear accommodating chamber SP2 in a radial direction. In the embodiment, the inverter accommodating chamber SP3 is disposed at an upper side (Z-direction Z1 side) of the motor accommodating chamber SP1 and the gear accommodating chamber SP2. In addition, the motor case 250 includes a second partition wall portion 2508 which partitions the motor accommodating chamber SP1 and the gear accommodating chamber SP2 from the inverter accommodating chamber SP3 in the radial direction. The second partition wall portion 2508 may be implemented by a part of the peripheral wall portion of the motor case 250.

The lid member 259 covers an upper opening of the inverter accommodating chamber SP3. The lid member 259 may be fastened to an upper portion of the inverter case portion 250a by a bolt or the like. Thus, the inverter case portion 250a has the inverter accommodating chamber SP3 formed, which is a closed space, in cooperation with the lid member 259. Accordingly, it is possible to appropriately implement an electromagnetic compatibility (EMC) countermeasure related to the drive device 70 (particularly, an inverter module 72 to be described later), and it is also possible to reduce problems such as spatial resonance.

The drive device 70 includes the inverter module 72 and a control device 74.

The inverter module 72 includes an inverter (not shown), and the inverter includes, for example, a power switching element (for example, a metal-oxide-semiconductor field effect transistor (MOSFET) or an insulated gate bipolar transistor (IGBT)) at each of a high potential side and a low potential side of a high-voltage battery Va for each phase, and the power switching element at the high potential side and the power switching element at the low potential side form upper and lower arms. The inverter may include a plurality of sets of upper and lower arms for each phase. Each power switching element may be driven by pulse width modulation (PWM) so as to generate a desired rotational torque under control of the control device 74. The high-voltage battery Va is, for example, a battery having a relatively high rated voltage, and may be, for example, a lithium ion battery or a fuel cell.

In addition to the inverter, the inverter module 72 may include a member for forming a cooling water passage. A smoothing capacitor or the like may be accommodated in the inverter accommodating chamber SP3.

The control device 74 controls the vehicle drive device 17. For example, the control device 74 controls the rotation electric machine 1 via an inverter. In the embodiment, the control device 74 controls an electric oil pump 90.

The control device 74 includes a control board 741. Various electronic components for the inverter such as a microcomputer 7412 for the inverter and a power supply circuit 7413 are mounted at the control board 741. In the embodiment, various electronic components (for example, an inverter or a microcomputer) for the electric oil pump 90 to be described later are further mounted at the control board 741. The control board 741 may be implemented by a plurality of substrates.

In the embodiment, as shown in FIG. 2, the inverter module 72 is disposed at the X-direction X2 side relative to the control board 741 of the control device 74. In other words, the control board 741 extends to the X-direction X1 side relative to the inverter module 72. Specifically, the inverter module 72 overlaps only the motor accommodating chamber SP1 when viewed in the radial direction, while the control board 741 overlaps the gear accommodating chamber SP2 when viewed in the radial direction. Accordingly, an interconnect length between a relay connector CN1 and a board-side connector CN2 at the control board 741 (control device 74), which will be described later, can be shortened, and efficient interconnection can be implemented.

Since the control board 741 extends to the X-direction X1 side relative to the inverter module 72, an interconnect and a circuit element of a low-voltage system can be separated from an interconnect and a circuit element of a high-voltage system in the X direction. Specifically, in the inverter accommodating chamber SP3, most or all of interconnects and circuit elements of the low-voltage system can be disposed at the X-direction X1 side, and most or all of interconnects and circuit elements of the high-voltage system can be disposed at the X-direction X2 side. Accordingly, it is possible to easily secure an insulation distance to be secured between the interconnect and the circuit element of the low-voltage system and the interconnect and the circuit element of the high-voltage system.

In the embodiment, an external connector CN3 of the low-voltage system may be disposed at a side surface of the inverter case portion 250*a* at the X-direction X1 side, and an external connector CN6 of the high-voltage system may be disposed at a side surface of the inverter case portion 250*a* at the X-direction X2 side. Accordingly, the external connector CN3 of the low-voltage system and the external connector CN6 of the high-voltage system can be disposed in accordance with a positional relationship between the interconnect and the circuit element of the low-voltage system and the interconnect and the circuit element of the high-voltage system.

The control board 741 preferably includes the board-side connector CN2 at an end portion at the X-direction X1 side. In the embodiment, as shown in FIG. 2, the board-side connector CN2 is provided at a position overlapping the gear accommodating chamber SP2 when viewed in the radial direction. Accordingly, interconnect lengths of interconnects L120 and L122 between the relay connector CN1 and the board-side connector CN2 to be described later can be shortened. In addition, an interconnect length of an interconnect L130 between the external connector CN3 of the low-voltage system and the board-side connector CN2 can be shortened. In the embodiment, the interconnects L120 and L122 between the relay connector CN1 and the board-side connector CN2 and the interconnect L130 between the external connector CN3 of the low-voltage system and the board-side connector CN2 extend to the X-direction X1 side relative to the board-side connector CN2. Accordingly, it is possible to efficiently secure an insulation distance of various interconnects of the low-voltage system (an insulation distance to the high-voltage system).

The cover member 252 is provided with a bearing 240 which rotatably supports a rotor 310. That is, the cover member 252 includes a bearing support portion 2524 which supports the bearing 240.

As shown in FIG. 2, the bearing 240 is provided on a radially outer side of an end portion of a rotor shaft 314 at the X2 side. Specifically, in the bearing 240, a radially outer side of an outer race is supported by the cover member 252, and a radially inner side of an inner race is supported by an outer circumferential surface of the rotor shaft 314. In a modification, conversely, in the bearing 240, the radially inner side of the inner race may be supported by the cover member 252, and the radially outer side of the outer race may be supported by an inner circumferential surface of the rotor shaft 314.

In the example shown in FIG. 2, the cover member 252 includes the circular bottom portion 2521 centered on the first axis A1 and a peripheral wall portion 2522 protruding from an outer circumferential edge of the bottom portion 2521 to the X-direction X1 side, and an end surface of the peripheral wall portion 2522 at the X-direction X1 side is coupled to the motor case 250. The cylindrical bearing support portion 2524 protruding to the X-direction X1 side is formed at a central portion (a portion centered on the first axis A1) of the bottom portion 2521 at the X-direction X1 side. The bearing support portion 2524 is concentrically formed around the first axis A1.

As shown in FIG. 2, an axially protruding portion 2525 is formed at a radially inner side of the cylindrical bearing support portion 2524 at the central portion (a portion centered on the first axis A1) of the bottom portion 2521 at the X-direction X1 side. The axially protruding portion 2525 is formed at the central portion (a portion centered on the first axis A1) of the bottom portion 2521 at the X-direction X1 side in a manner of protruding to the X-direction X1 side. A first oil passage 81 and a second oil passage 82 for supplying oil to a hollow inner portion 314A (an axial center oil passage 83) of the rotor shaft 314 may be formed in the axially protruding portion 2525. Oil may be supplied from the electric oil pump 90 to the first oil passage 81 and the second oil passage 82.

For example, as shown in FIG. 2, the electric oil pump 90 may be disposed in the gear accommodating chamber SP2. In the embodiment, as an example, as shown in FIG. 2, the electric oil pump 90 is fixed to the first partition wall portion 2500. The electric oil pump 90 may be disposed below the input shaft 31. The electric oil pump 90 may be disposed at a position overlapping the counter shaft 41 when viewed in an upper-lower direction (see FIG. 3). An oil temperature sensor 92 may be disposed near the electric oil pump 90.

The gear case member 254 has the gear accommodating chamber SP2 formed therein, which accommodates the power transmission mechanism 7. The gear accommodating chamber SP2 may be an oil-tight space communicating with the motor accommodating chamber SP1. The gear case member 254 is coupled to the motor case 250 at the X-direction X1 side. In the embodiment, the gear case member 254 is coupled to the motor case 250 in a manner of abutting against a mating surface 2502A of the coupling portion 2502 of the first partition wall portion 2500 in the axial direction. The gear case member 254 is in the form of a cover which covers the gear accommodating chamber SP2 at the X-direction X1 side. The gear case member 254 may be implemented by combining a plurality of members. Although the gear case member 254 is in the form of a cover in the example shown in FIG. 2, the gear case member 254 may have a peripheral wall portion which is relatively long in the X direction so as to have a peripheral wall portion which surrounds a radially outer side of the power transmission mechanism 7 while having a function of the cover. In this case, a part of the gear accommodating chamber SP2 at the X-direction X2 side may be formed by the motor case 250 as shown in FIG. 2.

The rotor 310 includes a rotor core 312 and the rotor shaft 314.

The rotor core 312 may be made of, for example, a laminated steel plate of circular ring-shaped magnetic bodies. Permanent magnets (not shown) may be embedded in the rotor core 312. Alternatively, the permanent magnets (not shown) may be attached to an outer circumferential surface of the rotor core 312. The permanent magnets (not shown) are freely arranged. The rotor core 312 is fixed to the outer circumferential surface of the rotor shaft 314 and rotates integrally with the rotor shaft 314.

The rotor shaft 314 defines the first axis A1 which is a rotation axis of the rotation electric machine 1. The rotor shaft 314 is rotatably supported by the cover member 252 via the bearing 240 at the X2 side relative to a portion to which the rotor core 312 is fixed. In addition, the rotor shaft 314 is rotatably supported by the first partition wall portion 2500 of the motor case 250 via the bearing 241 in the rotation electric machine 1 at the X-direction X1 side. In this way, the rotor shaft 314 may be rotatably supported by the case 2 at both ends in the axial direction.

In the embodiment, the rotor shaft 314 supports the bearing 241. The rotor shaft 314 abuts against the inner race (inner ring) of the bearing 241 in the axial direction at the X-direction X2 side. The rotor shaft 314 receives a thrust load toward the X-direction X2 side via the inner race of the bearing 241. The rotor shaft 314 cooperates with the first partition wall portion 2500 of the case 2 to form an annular space in which the bearing 241 is fitted.

The rotor shaft 314 is coupled to the input shaft 31 at the X-direction X1 side in a power transmittable manner. In the embodiment, as an example, a spline 31461 is formed at the inner circumferential surface of the rotor shaft 314, and is spline-fitted so as to mesh with a spline 3162 formed at an outer circumferential surface of the input shaft 31.

The rotor shaft 314 is, for example, in the form of a hollow tube, and has the hollow inner portion 314A. The hollow inner portion 314A may extend over an entire length of the rotor shaft 314 in the axial direction. In the embodiment, as an example, the inner circumferential surface of the rotor shaft 314 has a constant inner diameter except for a section where the spline 31461 is formed. In another embodiment, the rotor shaft 314 may be reduced in diameter at both ends or one end in the axial direction. In this case, the inner circumferential surface of the rotor shaft 314 may have a reduced inner diameter at both ends or one end in the axial direction.

The hollow inner portion 314A of the rotor shaft 314 may function as the axial center oil passage 83. That is, oil may be supplied to the hollow inner portion 314A via the first oil passage 81 and the second oil passage 82 in the cover member 252. In this case, by cooling the rotor shaft 314, the rotor core 312 (and the permanent magnet when the permanent magnet is provided) can be cooled from a radially inner side.

A weir portion 89 for oil reservoir may be formed in the hollow inner portion 314A of the rotor shaft 314. That is, the rotor shaft 314 may include the weir portion 89 protruding to a radially inner side over an entire circumference in a circumferential direction at the inner circumferential surface. In the example shown in FIG. 2, as an example, the weir portion 89 is formed by a circular ring-shaped plug fitted into the hollow inner portion 314A of the rotor shaft 314.

The rotor shaft 314 may be formed with oil holes 831A and 831B in the radial direction for discharging oil to coil end portions 322A and 322B of a stator 320, respectively.

The oil hole 831A may have an opening facing the coil end portion 322A in the radial direction, and supply oil in the axial center oil passage 83 toward the coil end portion 322A. In the example shown in FIG. 2, the oil hole 831A linearly extends parallel to the radial direction, but may linearly extend in an oblique direction slightly inclined with respect to the radial direction.

The oil hole 831B may have an opening facing the coil end portion 322B in the radial direction, and supply oil in the axial center oil passage 83 toward the coil end portion 322B. In the example shown in FIG. 2, the oil hole 831B linearly extends parallel to the radial direction, but may linearly extend in an oblique direction slightly inclined with respect to the radial direction.

The stator 320 includes a stator core 321 and a stator coil 322.

The stator core 321 may be made of, for example, a laminated steel plate of circular ring-shaped magnetic bodies. Teeth (not shown) protruding to a radially inner side are radially formed at an inner circumferential portion of the stator core 321.

The stator coil 322 may have, for example, a form in which an insulating film is applied to a conductor having a rectangular cross section or a circular cross section. The stator coil 322 is wound around the teeth (not shown) of the stator core 321. For example, the stator coil 322 may be electrically coupled by a Y-connection or may be electrically coupled by a Δ-connection in one or more parallel relationships.

The stator coil 322 includes the coil end portions 322A and 322B which are portions protruding to an axially outer side from slots of the stator core 321. The coil end portion 322A is positioned at the X1 side, and the coil end portion 322B is positioned at the X2 side.

The power transmission mechanism 7 is disposed in the gear accommodating chamber SP2. Since each component of the power transmission mechanism 7 is as described above with reference to FIG. 1, the same reference signs are used in FIG. 2, and description thereof will be omitted as appropriate.

In the embodiment, a parking gear 36 of a parking lock mechanism is attached to the input shaft 31 of the power transmission mechanism 7. The parking lock mechanism includes a mechanism (not shown) which switches the parking gear 36 between a rotatable state and a non-rotatable state (locked state).

The parking gear 36 is a rotation member which rotates around the first axis A1. The parking gear 36 is coupled to the input shaft 31 of the input member 3 so as to rotate integrally with the input shaft 31 of the input member 3. The parking gear 36 is disposed between the input gear 32 and the bearing 241 in the axial direction.

Figure 3:
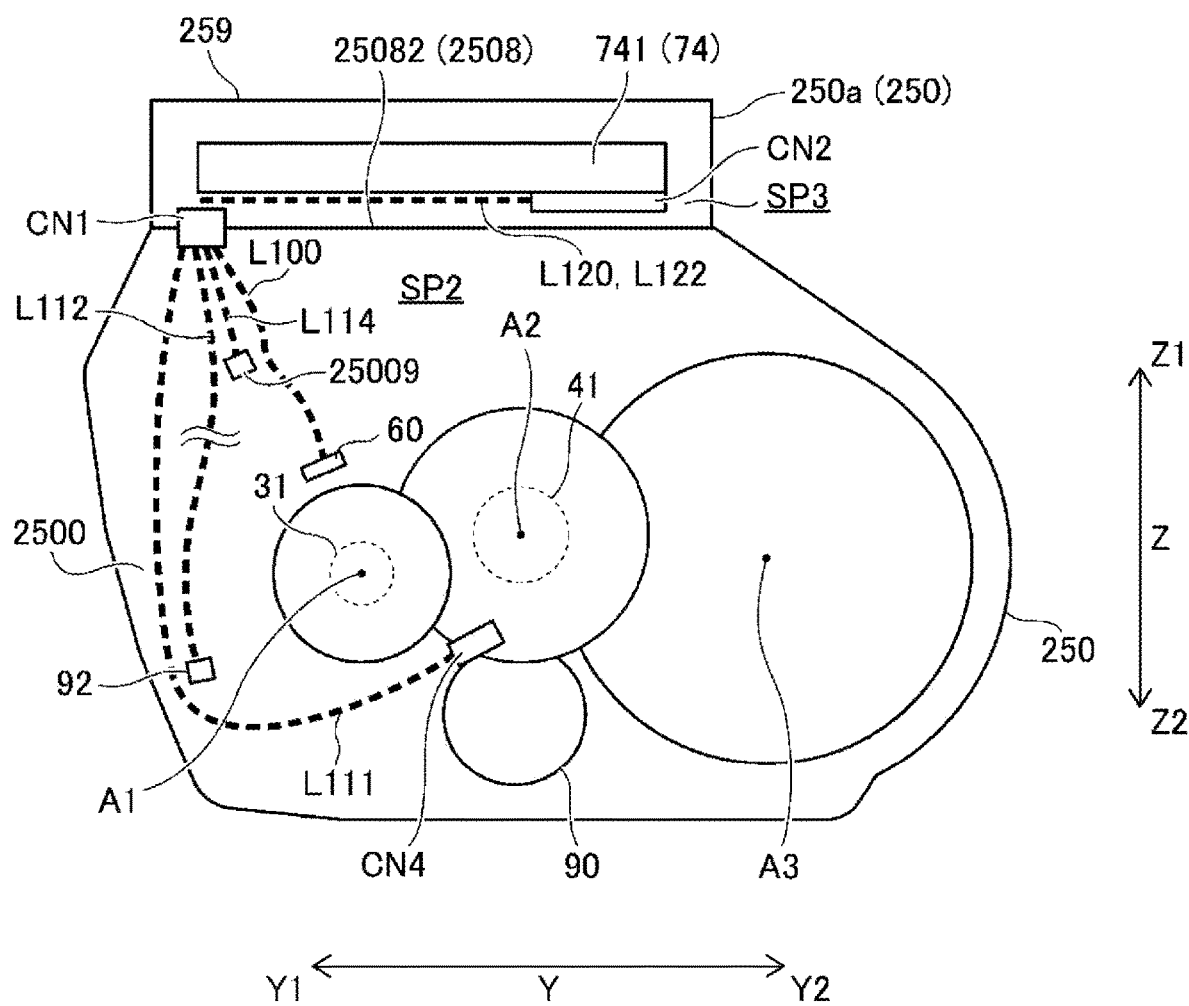
FIG. 3 is a view schematically showing insides of a gear accommodating chamber and an inverter accommodating chamber when a first partition wall portion is viewed from an X-direction X1 side.
Figure 4:
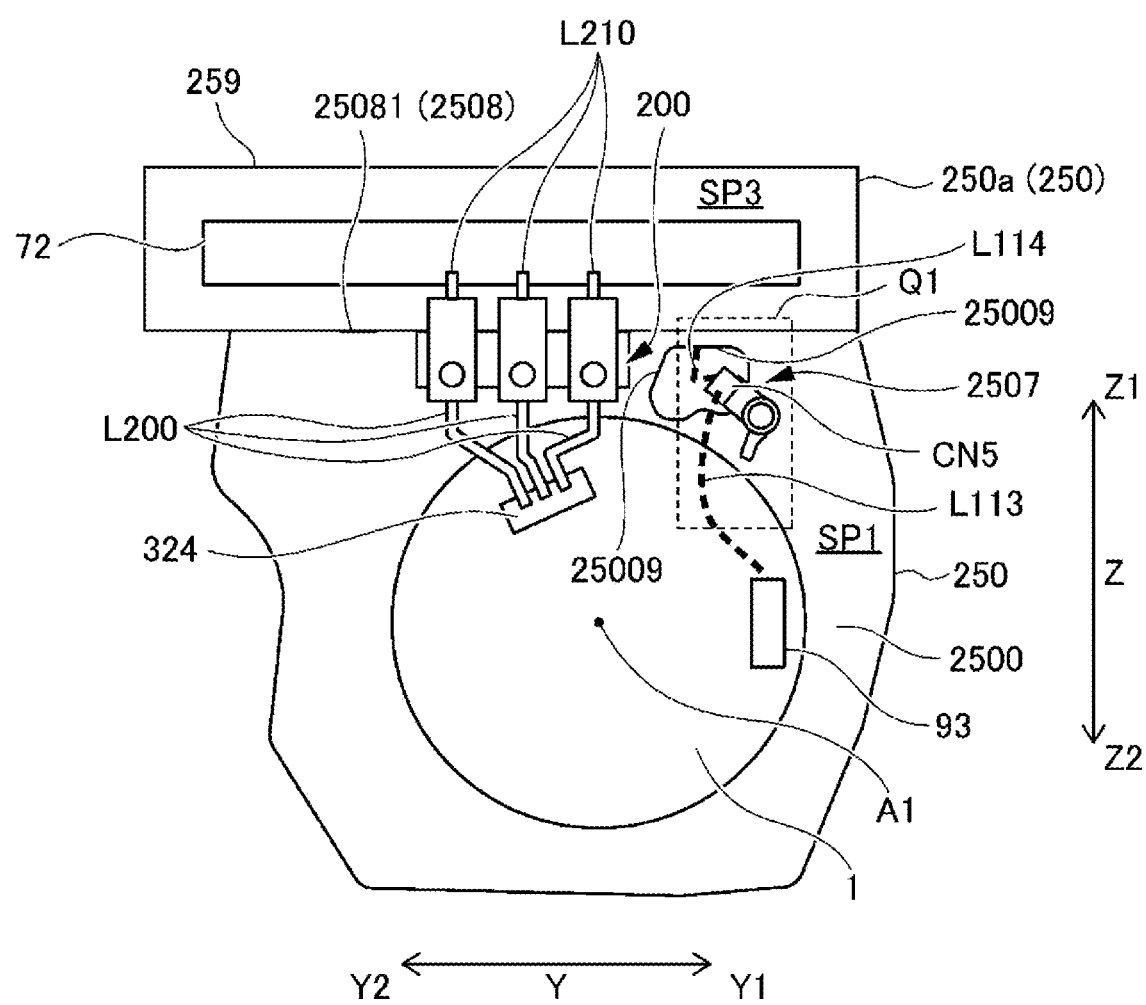
FIG. 4 is a view schematically showing insides of a motor accommodating chamber and the inverter accommodating chamber when the first partition wall portion is viewed from an X-direction X2 side.
Figure 5:
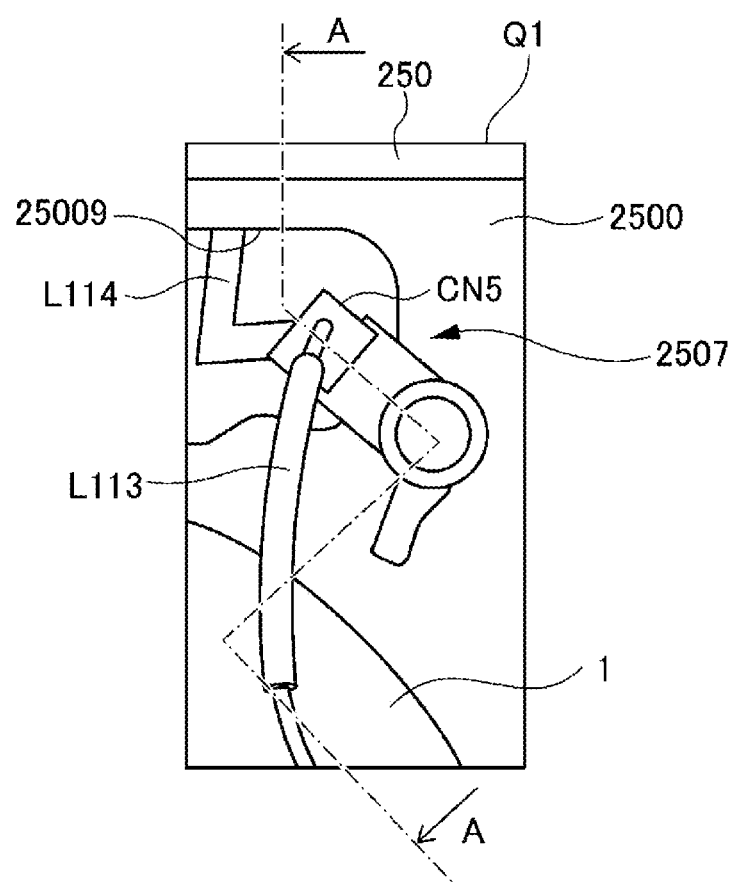
FIG. 5 is an enlarged view of a Q1 portion in FIG. 4.
Figure 6:
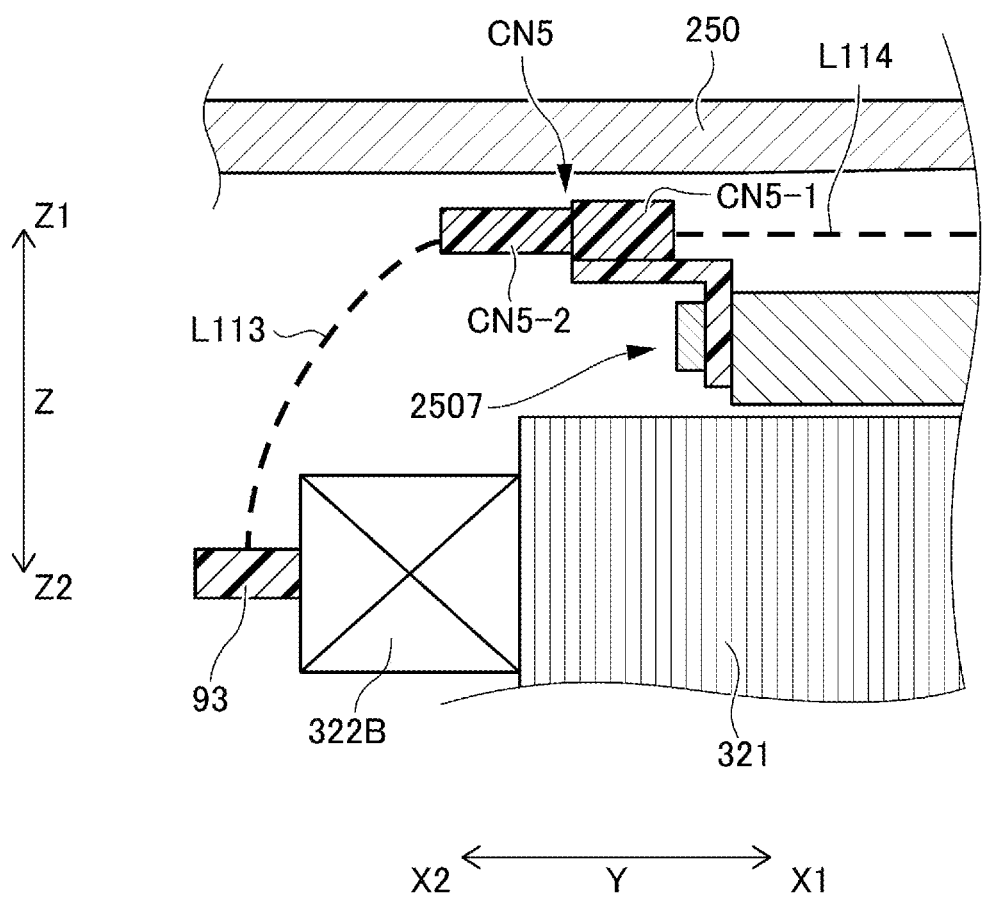
FIG. 6 is a schematic cross-sectional view taken along a line V-V in FIG. 5.

Here, an interconnect structure of the embodiment will be described with reference to FIGS. 3 to 6 while further referring to FIG. 2. In FIG. 2, in the interconnect structure of the embodiment, the interconnect of the low-voltage system is schematically shown by dotted lines L100 to L140, and the interconnect of the high-voltage system is shown by hatched rectangular lines L200 to L220. One of the dotted lines L100 to L140 and the rectangular lines L200 to L220 may represent a plurality of interconnects. Paths of the dotted lines L100 to L140 and the rectangular lines L200 to L220 are schematically shown, and details thereof are freely described. The interconnect and the like according to the dotted lines L100 to L140 may be actually supported by the case 2 by a clamp or the like as appropriate. In FIG. 2, the interconnect according to the dotted lines L100 to L140 are viewed from a Y1 side in FIG. 3. FIG. 3 is a view schematically showing insides of the gear accommodating chamber SP2 and the inverter accommodating chamber SP3 when the first partition wall portion 2500 is viewed from the X-direction X1 side. FIG. 4 is a view schematically showing insides of the motor accommodating chamber SP1 and the inverter accommodating chamber SP3 when the first partition wall portion 2500 is viewed from the X-direction X2 side. FIG. 5 is an enlarged view of a Q1 portion in FIG. 4. FIG. 6 is a schematic cross-sectional view taken along a line V-V in FIG. 5. In FIGS. 3 and 4, a Y direction orthogonal to both the X direction and a Z direction is defined, and the Y1 side and a Y2 side related to the Y direction are defined.

The interconnect of the low-voltage system includes the first interconnects L100 and L120 which electrically couple the rotation angle sensor 60 and the drive device 70. The rotation angle sensor 60 is provided at an end portion of the rotation electric machine 1 at the X-direction X1 side (an end portion at a gear accommodating chamber SP2 side). In the embodiment, as an example, as shown in FIG. 2, the rotation angle sensor 60 is provided at an end portion of the rotor shaft 314 at the X-direction X1 side. The rotation angle sensor 60 may be, for example, a resolver. In this case, a non-rotating portion (stator portion) of the rotation angle sensor 60 may be fixed to the first partition wall portion 2500 as shown in FIG. 2. Hereinafter, when only one of the first interconnects L100 and L120 is indicated, the interconnect is simply referred to as the interconnect L100 or the interconnect L120.

As shown in FIG. 2, the first interconnects L100 and L120 are routed so as to reach the inside of the gear accommodating chamber SP2 from the inside of the motor accommodating chamber SP1 through the first partition wall portion 2500, and reach the inverter accommodating chamber SP3 from the inside of the gear accommodating chamber SP2 through the second partition wall portion 2508.

The interconnect L100 has one end electrically coupled to the rotation angle sensor 60 and the other end electrically coupled to the relay connector CN1. The interconnect L100 may pass through the first partition wall portion 2500 via a through hole 25008 in the axial direction formed in the first partition wall portion 2500. In the embodiment, since the rotation angle sensor 60 is supported by the first partition wall portion 2500 as described above, it is possible to shorten an interconnect length of a section from the rotation angle sensor 60 to passing through the first partition wall portion 2500 (when drawn out to the gear accommodating chamber SP2 side via the through hole 25008) in the entire interconnect of the interconnect L100. In the example shown in FIG. 1, a connector CN7 provided at a substrate of the rotation angle sensor 60 is passed through the through hole 25008, and a part of the interconnect L100 is implemented via the connector CN7.

As shown in FIG. 2, the relay connector CN1 has a function of relaying various interconnects between the gear accommodating chamber SP2 and the inverter accommodating chamber SP3. The relay connector CN1 is provided at a portion 25082 of the second partition wall portion 2508 which partitions the gear accommodating chamber SP2 in the radial direction. The relay connector CN1 may be disposed at a Y-direction Y1 side relative to the input shaft 31 (first axis A1).

The interconnect L120 has one end electrically coupled to the relay connector CN1 and the other end electrically coupled to the board-side connector CN2 at the control board 741. The board-side connector CN2 may be electrically coupled to the microcomputer 7412 via a printed circuit (not shown) on the control board 741. In this way, the rotation angle sensor 60 is electrically coupled to the control device 74 via the interconnect L100, the relay connector CN1, the interconnect L120, and the board-side connector CN2.

In the example shown in FIG. 2, the board-side connector CN2 may be electrically coupled to a host electronic control unit (ECU) 99 via the external connector CN3 of the low-voltage system. Specifically, the board-side connector CN2 and the external connector CN3 of the low-voltage system are electrically coupled to each other by the interconnect L130, and the external connector CN3 of the low-voltage system and the host ECU 99 are electrically coupled to each other by the interconnect L140. The interconnect L140 may include a bus based on a controller area network (CAN), Ethernet (registered trademark), or the like.

In the embodiment, the interconnect L120 is in the form of a bundle of a plurality of interconnects, and electrically couples each interconnect from electronic components other than the rotation angle sensor 60 from the relay connector CN1 to the board-side connector CN2. The interconnect L120, together with the interconnect L122 to be described later, may be implemented by a flexible substrate or the like.

In this way, according to the embodiment, since the rotation angle sensor 60 is disposed at the end portion of the rotor shaft 314 at the X-direction X1 side, it is possible to implement efficient routing as compared with a case where the rotation angle sensor 60 is disposed at the end portion of the rotor shaft 314 at the X-direction X2 side.

Specifically, in the related art disclosed in Reference 2, not only a sensor cover but also a seal member and a fastening bolt are required when the sensor cover is attached to a motor cover, which is disadvantageous in that the number of components related to the rotation angle sensor increases. In addition, since it is necessary to form a groove portion in the motor cover, it is disadvantageous from the viewpoint of deterioration of assembly properties and an increase in a size of the motor cover in the axial direction (an increase in a thickness of the motor cover in the axial direction for forming the groove portion and an increase in a size due to the sensor cover). In contrast, according to the embodiment, such a sensor cover and various members (for example, a seal member) related to the sensor cover are unnecessary, and the first interconnects L100 and L120 can be formed without substantially increasing the size in the axial direction.

Since the first interconnects L100 and L120 are relayed by the relay connector CN1 provided at the second partition wall portion 250B, it is not necessary to pass through an outside of the vehicle drive device 17 (an outside different from the motor accommodating chamber SP1, the gear accommodating chamber SP2, and the inverter accommodating chamber SP3). Accordingly, need for a sealing material, a cover member, or the like which may be required when an interconnect is drawn out to an outside is eliminated, and good assembly properties can be secured.

For example, when the rotation electric machine 1 is assembled into the motor case 250 to which the relay connector CN1 is attached, the interconnect L100 can be drawn out to the gear accommodating chamber SP2 and coupled to the relay connector CN1, and thus the assembly can be implemented by relatively easy work.

In this way, according to the embodiment, it is possible to form the first interconnects L100 and L120 related to the vehicle drive device 17 with good assembly properties without substantially increasing a size of the vehicle drive device 17 in the axial direction.

According to the embodiment, the interconnect of the low-voltage system from the rotation angle sensor 60 which is an electronic component disposed in the motor accommodating chamber SP1 can be routed while securing an insulation distance to the interconnect of the high-voltage system. Specifically, as described above, the first interconnects L100 and L120 are routed so as to reach the inverter accommodating chamber SP3 from the inside of the motor accommodating chamber SP1 through the first partition wall portion 250C and through the inside of the gear accommodating chamber SP2. Accordingly, the first interconnects L100 and L120 (the interconnect of the low-voltage system from the rotation angle sensor 60) can be easily separated from the interconnect of the high-voltage system disposed at the X-direction X2 side in the motor accommodating chamber SP1 by a necessary insulation distance.

Thus, according to the embodiment, the interconnect of the low-voltage system from the rotation angle sensor 60 can be efficiently routed inside the case 2 (that is, the first interconnects L100 and L120 do not pass through an outside of the case 2) while securing the insulation distance to a high-voltage interconnect portion (for example, a terminal portion 324 of the stator 320, an interconnect of high-voltage system indicated by the rectangular line L200, and a terminal block 200) electrically coupled to the stator coil 322 of the rotation electric machine 1.

In the embodiment, the interconnect of the low-voltage system further includes an interconnect L111 from a connector CN4 for the electric oil pump 90. The electric oil pump 90 is electrically coupled to the control device 74 via the interconnect L111. The interconnect L111 has one end electrically coupled to the connector CN4 and the other end electrically coupled to the relay connector CN1. As shown in FIG. 3, the interconnect L111 may be routed around a lower side of the input shaft 31. The interconnect L111 electrically coupled to the relay connector CN1 is electrically coupled to the control device 74 via the interconnect L120. In this way, the electric oil pump 90 is electrically coupled to the control device 74 via the interconnect L111, the relay connector CN1, the interconnect L120, and the board-side connector CN2.

In the embodiment, the interconnect of the low-voltage system further includes an interconnect L112 from the oil temperature sensor 92. The oil temperature sensor 92 detects a temperature of oil discharged from the electric oil pump 90. The oil temperature sensor 92 supplies an electric signal corresponding to the temperature of the oil to the control device 74 via the interconnect L112. The oil temperature sensor 92 may be provided near the electric oil pump 90 (near a discharge port of the electric oil pump 90). In the embodiment, as shown in FIG. 2, the oil temperature sensor 92 is fixed to the first partition wall portion 250C. As shown in FIG. 2, the oil temperature sensor 92 may be provided below the input shaft 31. As shown in FIG. 3, the oil temperature sensor 92 may be provided at the Y-direction Y1 side relative to the input shaft 31. The interconnect L112 has one end electrically coupled to the oil temperature sensor 92 and the other end electrically coupled to the relay connector CN1. The interconnect L112 electrically coupled to the relay connector CN1 is electrically coupled to the control device 74 via the interconnect L120. In this way, the oil temperature sensor 92 is electrically coupled to the control device 74 via the interconnect L112, the relay connector CN1, the interconnect L120, and the board-side connector CN2.

In the embodiment, the interconnect of the low-voltage system further includes second interconnects L113, L114, and L122 from a thermistor 93. The thermistor 93 is provided in the stator 320 (for example, the stator coil 322). Hereinafter, when only one or two of the second interconnects L113, L114, and L122 are indicated, the interconnect is also simply referred to as the interconnect L113, the interconnect L114, or the interconnect L122.

In the embodiment, the thermistor 93 is provided in the coil end portion 322B at the X-direction X2 side. In this case, the second interconnects L113 and L114 can be routed more easily than a case where the thermistor 93 is provided in the coil end portion 322A at the X-direction X1 side. That is, after the rotation electric machine 1 is assembled to the motor case 250, the second interconnects L113 and L114 can be easily routed using an opening of the motor case 250 at the X-direction X2 side.

The interconnect L113 has one end electrically coupled to the thermistor 93 and the other end electrically coupled to an intermediate connector CN5. As shown in FIG. 2, the intermediate connector CN5 is disposed in the motor accommodating chamber SP1 by using a space between the stator 320 and the motor case 250 in the radial direction.

As shown in FIGS. 5 and 6, the intermediate connector CN5 may be supported by the motor case 250 using a fixing clamp 250Z. In this case, before the rotation electric machine 1 is assembled to the motor case 250, a connector portion CN5-1 at the X-direction X1 side among two connectors (male and female connectors) forming the intermediate connector CN5 may be fixed to the fixing clamp 250Z. In this case, relatively easy assembly can be implemented by fitting a connector portion CN5-2 at the X-direction X2 side to which the interconnect L113 is coupled into the connector portion CN5-1 at the X-direction X1 side. In order to improve assembly properties related to such assembly, the intermediate connector CN5 is preferably disposed at the X2 side relative to a center of the stator 320 in the axial direction, as shown in FIG. 2. Accordingly, it is not necessary to perform work in a deep space (a deep space when viewed from the X2 side) such as the X1 side relative to the center of the stator 320 in the axial direction, and the assembly properties when the connector portion CN5-2 is fitted to the connector portion CN5-1 are good.

As shown in FIGS. 5 and 6, the intermediate connector CN5 may be disposed at a Z-direction Z1 side relative to the first axis A1, and may be disposed at the Y-direction Y1 side relative to the first axis A1 similarly to the relay connector CN1. In this case, since a linear distance between the intermediate connector CN5 and the relay connector CN1 is shortened, an interconnect length of the interconnect L114 to be described later can be efficiently shortened.

The interconnect L114 has one end (an end portion at the X-direction X2 side) electrically coupled to the intermediate connector CN5, and the other end (an end portion at the X-direction X1 side) electrically coupled to the relay connector CN1. The interconnect L114 reaches the gear accommodating chamber SP2, from the intermediate connector CN5 through the first partition wall portion 2500, and from the motor accommodating chamber SP1, and is electrically coupled to the relay connector CN1. In this case, the interconnect L114 may pass through the first partition wall portion 2500 via a through hole 25009 in the axial direction formed in the first partition wall portion 2500. The interconnect L114 extends above the input shaft 31 (the first axis A1) in the gear accommodating chamber SP2. As described above, when the intermediate connector CN5 is disposed at the Z-direction Z1 side relative to the first axis A1 and at the Y-direction Y1 side relative to the first axis A1, the interconnect L114 can be routed linearly with a relatively short interconnect length. The interconnect L114 electrically coupled to the relay connector CN1 in this way is electrically coupled to the interconnect L122 in the relay connector CN1.

Similarly to the interconnect L120 of the above first interconnects L100 and L120, the interconnect L122 has one end electrically coupled to the relay connector CN1 and the other end electrically coupled to the board-side connector CN2 at the control board 741. In this way, the thermistor 93 is electrically coupled to the control device 74 via the interconnect L113, the interconnect L114, the relay connector CN1, the interconnect L122, and the board-side connector CN2.

In this way, according to the embodiment, all interconnects of the low-voltage system are collected in one relay connector CN1, and can reach the inverter accommodating chamber SP3 through the second partition wall portion 2508 via one relay connector CN1. Accordingly, it is possible to implement an efficient configuration as compared with a case where a plurality of relay connectors (for example, one relay connector for respective one of the motor accommodating chamber SP1 and the gear accommodating chamber SP2) are used.

According to the embodiment, since all the interconnects of the low-voltage system are relayed by the relay connector CN1 provided at the second partition wall portion 2508, it is not necessary to pass through the outside of the vehicle drive device 17 (the outside different from the motor accommodating chamber SP1, the gear accommodating chamber SP2, and the inverter accommodating chamber SP3). Accordingly, need for a sealing material, a cover member, or the like which may be required for passing through the outside is eliminated, and good assembly properties can be secured.

In this way, according to the embodiment, it is possible to form all the interconnects of the low-voltage system related to the vehicle drive device 17 with good assembly properties without substantially increasing the size of the vehicle drive device 17 in the axial direction.

The interconnect of the high-voltage system includes a bus bar (power line) L200 from the terminal portion 324 of the stator 320 to the terminal block 200 provided at the second partition wall portion 2508, and a bus bar L210 from the terminal block 200 to the inverter module 72. An end portion (an end portion of a connecting wire) of each phase of the stator coil 322 is electrically coupled to the terminal portion 324.

The terminal portion 324 of the stator 320 may be disposed to offset in the circumferential direction relative to the thermistor 93 above. In the embodiment, as shown in FIG. 4, the terminal portion 324 is disposed near a zenith portion, while the thermistor 93 is disposed near a center in the upper-lower direction. Accordingly, a distance between the thermistor 93 and the terminal portion 324 can be relatively increased, and a noise or the like which may be mixed into the interconnects L113 and L114 related to the thermistor 93 due to the interconnect of the high-voltage system related to the terminal portion 324 can be eliminated or reduced.

The terminal block 200 is provided at the portion 25081 of the second partition wall portion 2508 which partitions the motor accommodating chamber SP1 in the radial direction. The terminal block 200 may have, for example, a form in which end portions of the bus bars L200 and L210 are integrated with a resin portion (not shown). Each bus bar L210 from the terminal block 200 is electrically coupled to the inverter module 72 in the inverter accommodating chamber SP3. A bus bar L212 from the inverter module 72 is electrically coupled to the external connector CN6 of the high-voltage system. The bus bar L220 from the external connector CN6 of the high-voltage system is electrically coupled to the high-voltage battery Va.

In this way, in the embodiment, since the interconnect of the high-voltage system is implemented in the inverter accommodating chamber SP3 at the X-direction X2 side, it is easy to secure a sufficient insulation distance to the interconnect of the low-voltage system disposed at the X-direction X1 side as described above.

Although the embodiment is described in detail, this disclosure is not limited to the specific embodiment, and various modifications and changes can be made within the scope of the claims. It is also possible to combine all or a plurality of components of the above embodiment. Among effects of the embodiment, effects according to dependent claims are additional effects distinguished from a generic concept (independent claim).

For example, in the above embodiment, the electric oil pump 90 is disposed in the gear accommodating chamber SP2, but may be disposed in the motor accommodating chamber SP1. In this case, the oil temperature sensor 92 may also be disposed in the motor accommodating chamber SP1. In this case, an interconnect from the electric oil pump 90 to the control device 74 (the same applies to an interconnect from the oil temperature sensor 92 to the control device 74) may be routed so as to reach the gear accommodating chamber SP2 from the motor accommodating chamber SP1 through the first partition wall portion 2500 and reach the inverter accommodating chamber SP3 through the relay connector CN1, similarly to the rotation angle sensor 60.

In the above embodiment, all the interconnects of the low-voltage system are collected in the relay connector CN1 disposed at the gear accommodating chamber SP2 side and then routed to the control device 74, but this disclosure is not limited to this. For example, the relay connector CN1 may be disposed in the motor accommodating chamber SP1 instead of the gear accommodating chamber SP2 (that is, disposed in the portion 25081 of the second partition wall portion 2508 which partitions the motor accommodating chamber SP1), and all the interconnects of the low-voltage system may be routed to the control device 74 after being collected in the relay connector.

REFERENCE SIGNS LIST

1: rotation electric machine
2: case (accommodating member)
2500: first partition wall portion
2508: second partition wall portion
25081: portion (first portion)
25082: portion (second portion)
7: power transmission mechanism
17: vehicle drive device
60: rotation angle sensor
70: drive device
90: electric oil pump (second electronic component)
92: oil temperature sensor (second electronic component)
93: thermistor (first electronic component)
SP1: motor accommodating chamber (first accommodating chamber)
SP2: gear accommodating chamber (second accommodating chamber)
SP3: inverter accommodating chamber (third accommodating chamber)
741: control board
72: inverter module (power module)
L100, L120: interconnect (first interconnect)
L113, L114, L122: interconnect (second interconnect)
L111, L112, L120: interconnect (third interconnect)
CN1: relay connector (first connector)
CN2: board-side connector (second connector)

The invention claimed is:

1. A vehicle drive device comprising:
a rotation electric machine;
a power transmission mechanism configured to transmit power based on a rotational torque generated by the rotation electric machine to a wheel;
a drive device configured to drive the rotation electric machine;
an accommodating member in which a first accommodating chamber which accommodates the rotation electric machine, a second accommodating chamber which accommodates the power transmission mechanism, and a third accommodating chamber which accommodates the drive device are internally formed;
a rotation angle sensor provided at an end portion of the rotation electric machine at a second accommodating chamber side in an axial direction in the first accommodating chamber and configured to acquire rotation angle information of the rotation electric machine; and
a first interconnect electrically coupling the rotation angle sensor and the drive device, wherein
in the accommodating member, a first partition wall portion which partitions the first accommodating chamber and the second accommodating chamber in the axial direction and a second partition wall portion which partitions the first accommodating chamber and the second accommodating chamber from the third accommodating chamber in a radial direction are formed,
the first interconnect is routed so as to reach an inside of the second accommodating chamber from an inside of the first accommodating chamber through the first partition wall portion and reach the third accommodating chamber from the inside of the second accommodating chamber through the second partition wall portion,
a terminal block electrically coupled to a coil of the rotation electric machine is provided in a first portion of the second partition wall portion which partitions the first accommodating chamber, and a first connector is provided in a second portion of the second partition wall portion which partitions the second accommodating chamber, and
the first interconnect reaches the third accommodating chamber from the inside of the second accommodating chamber via the first connector.

2. The vehicle drive device according to claim 1, wherein the terminal block is disposed at an opposite side to the second accommodating chamber side relative to a stator core of the rotation electric machine in the axial direction.

3. The vehicle drive device according to claim 1, wherein the drive device includes
a power module disposed to overlap the first accommodating chamber when viewed in the radial direction, and
a control board having a second connector electrically coupled to the first connector, and
the second connector is disposed to overlap the second accommodating chamber when viewed in the radial direction.

4. The vehicle drive device according to claim 1, further comprising:
one or more first electronic components different from the rotation angle sensor in the first accommodating chamber; and
a second interconnect electrically coupling the one or more first electronic components and the drive device, wherein
the second interconnect is routed so as to reach the inside of the second accommodating chamber from the inside of the first accommodating chamber through the first partition wall portion and reach the third accommodating chamber from the inside of the second accommodating chamber via the first connector.

5. The vehicle drive device according to claim 1, further comprising:
one or more second electronic components in the second accommodating chamber; and
a third interconnect electrically coupling the one or more second electronic components and the drive device, wherein
the third interconnect is routed so as to reach the third accommodating chamber from the inside of the second accommodating chamber via the first connector.

6. The vehicle drive device according to claim 2, wherein the drive device includes
a power module disposed to overlap the first accommodating chamber when viewed in the radial direction, and a control board having a second connector electrically coupled to the first connector, and the second connector is disposed to overlap the second accommodating chamber when viewed in the radial direction.

7. The vehicle drive device according to claim 2, further comprising:

one or more first electronic components different from the rotation angle sensor in the first accommodating chamber; and a second interconnect electrically coupling the one or more first electronic components and the drive device, wherein the second interconnect is routed so as to reach the inside of the second accommodating chamber from the inside of the first accommodating chamber through the first partition wall portion and reach the third accommodating chamber from the inside of the second accommodating chamber via the first connector.

8. The vehicle drive device according to claim 3, further comprising:

one or more first electronic components different from the rotation angle sensor in the first accommodating chamber; and a second interconnect electrically coupling the one or more first electronic components and the drive device, wherein the second interconnect is routed so as to reach the inside of the second accommodating chamber from the inside of the first accommodating chamber through the first partition wall portion and reach the third accommodating chamber from the inside of the second accommodating chamber via the first connector.

9. The vehicle drive device according to claim 6, further comprising:

one or more first electronic components different from the rotation angle sensor in the first accommodating chamber; and a second interconnect electrically coupling the one or more first electronic components and the drive device, wherein the second interconnect is routed so as to reach the inside of the second accommodating chamber from the inside of the first accommodating chamber through the first partition wall portion and reach the third accommodating chamber from the inside of the second accommodating chamber via the first connector.

10. The vehicle drive device according to claim 2, further comprising:

one or more second electronic components in the second accommodating chamber; and a third interconnect electrically coupling the one or more second electronic components and the drive device, wherein the third interconnect is routed so as to reach the third accommodating chamber from the inside of the second accommodating chamber via the first connector.

11. The vehicle drive device according to claim 3, further comprising:

one or more second electronic components in the second accommodating chamber; and a third interconnect electrically coupling the one or more second electronic components and the drive device, wherein the third interconnect is routed so as to reach the third accommodating chamber from the inside of the second accommodating chamber via the first connector.

12. The vehicle drive device according to claim 4, further comprising:

one or more second electronic components in the second accommodating chamber; and a third interconnect electrically coupling the one or more second electronic components and the drive device, wherein the third interconnect is routed so as to reach the third accommodating chamber from the inside of the second accommodating chamber via the first connector.

13. The vehicle drive device according to claim 6, further comprising:

one or more second electronic components in the second accommodating chamber; and a third interconnect electrically coupling the one or more second electronic components and the drive device, wherein the third interconnect is routed so as to reach the third accommodating chamber from the inside of the second accommodating chamber via the first connector.

14. The vehicle drive device according to claim 7, further comprising:

one or more second electronic components in the second accommodating chamber; and a third interconnect electrically coupling the one or more second electronic components and the drive device, wherein the third interconnect is routed so as to reach the third accommodating chamber from the inside of the second accommodating chamber via the first connector.

15. The vehicle drive device according to claim 8, further comprising:

one or more second electronic components in the second accommodating chamber; and a third interconnect electrically coupling the one or more second electronic components and the drive device, wherein the third interconnect is routed so as to reach the third accommodating chamber from the inside of the second accommodating chamber via the first connector.

16. The vehicle drive device according to claim 9, further comprising:

one or more second electronic components in the second accommodating chamber; and a third interconnect electrically coupling the one or more second electronic components and the drive device, wherein the third interconnect is routed so as to reach the third accommodating chamber from the inside of the second accommodating chamber via the first connector.

* * * * *